United States Patent [19]

Ballas, Sr. et al.

[11] 4,382,356
[45] May 10, 1983

[54] ROTARY-TYPE LAWNMOWER

[75] Inventors: George C. Ballas, Sr.; Albert W. Mitchell, both of Houston, Tex.

[73] Assignee: Emerson Electric Co., St. Louis, Mo.

[21] Appl. No.: 290,250

[22] Filed: Aug. 5, 1981

Related U.S. Application Data

[63] Continuation of Ser. No. 19,057, Mar. 9, 1979, abandoned, which is a continuation of Ser. No. 786,309, Apr. 11, 1977, abandoned, which is a continuation-in-part of Ser. No. 674,323, Apr. 7, 1976, Pat. No. 4,112,653.

[51] Int. Cl.³ ............................................. A01D 55/16
[52] U.S. Cl. ................................... 56/12.7; 56/320.1; 56/295
[58] Field of Search ...................... 56/295, 12.7, 320.1, 56/320.2, 17.5; 30/276, 347; 172/15

[56] References Cited

U.S. PATENT DOCUMENTS

| | | | |
|---|---|---|---|
| 3,014,333 | 12/1961 | Clark, Jr. | 56/295 |
| 3,104,510 | 9/1963 | Voight | 56/295 |
| 3,320,732 | 5/1967 | Kirk . | |
| 3,474,608 | 10/1969 | Frick . | |
| 4,062,114 | 12/1977 | Luick . | |
| 4,065,913 | 1/1978 | Fisher et al. . | |
| 4,068,376 | 1/1978 | Briar . | |
| 4,165,597 | 8/1979 | Fisher et al. | 56/295 |

FOREIGN PATENT DOCUMENTS

| | | |
|---|---|---|
| 2032206 | 1/1972 | Fed. Rep. of Germany . |
| 281338 | 3/1952 | Switzerland . |

Primary Examiner—Jay N. Eskovitz
Attorney, Agent, or Firm—Hubbard, Thurman, Turner & Tucker

[57] ABSTRACT

A rotary-type lawnmower having unique non-metallic cutting elements carried on a rotating disc-like head with a smooth rim and lower exposed surface without significant projections or recesses capable of inflicting injury to human parts. The lawnmower produces a smooth and even cut equal to rotary metal-blade machines. The cutting elements are tapered pins extruded from flexible polymeric material such as Nylon ® polymer. Each cutting pin has a first portion providing supporting surfaces and an enlargement for securing the pin into the head. The cutting pins extend from the head in a tapered free-traveling end portion to a cutting end located at a cutting plane adjacent the ground's surface. The cutting pins are slidably inserted and removed from the disc.

39 Claims, 9 Drawing Figures

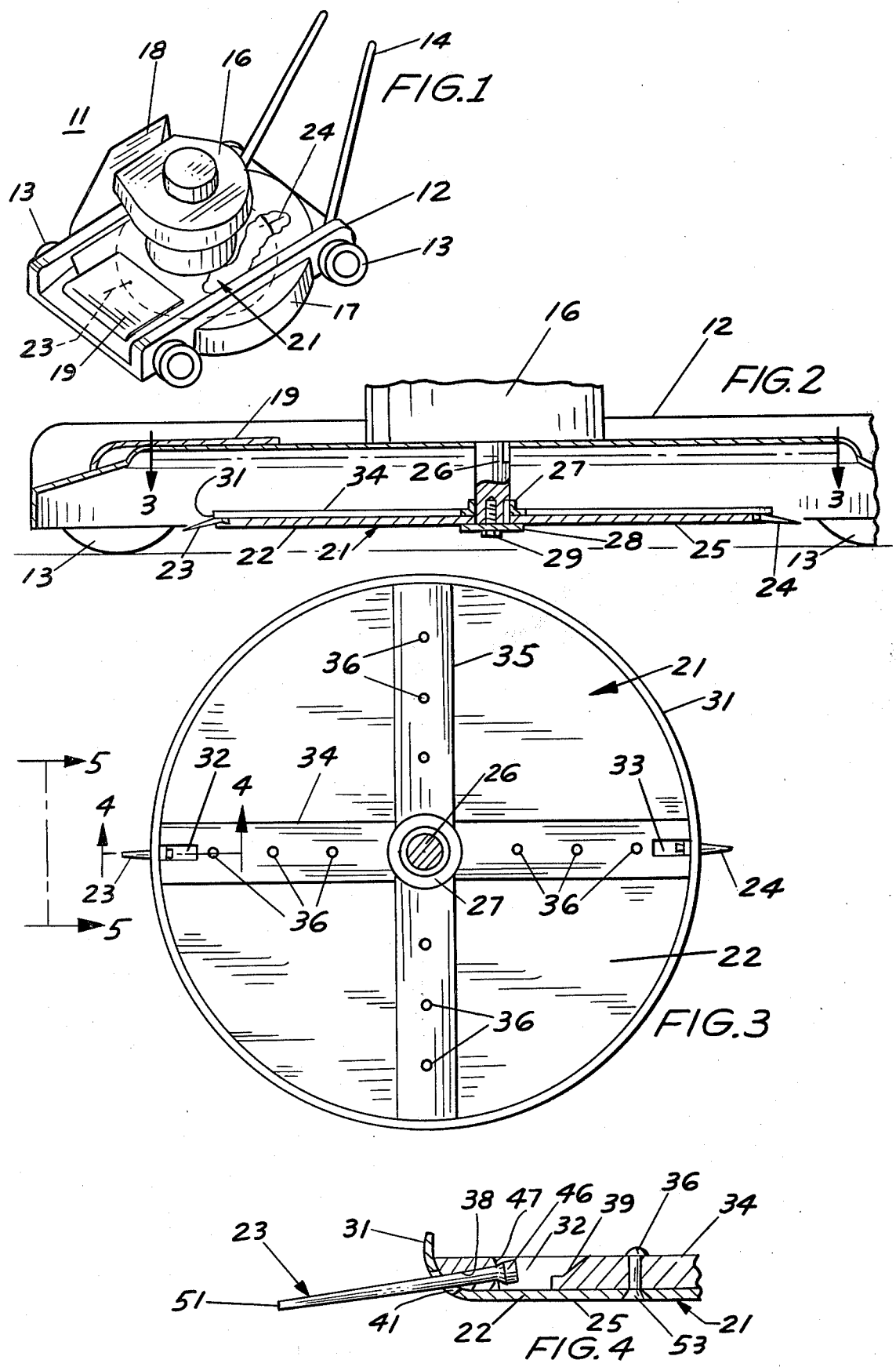

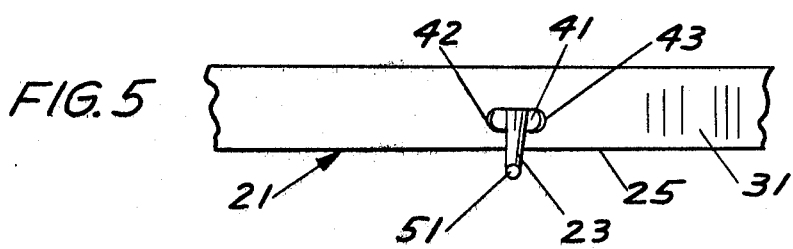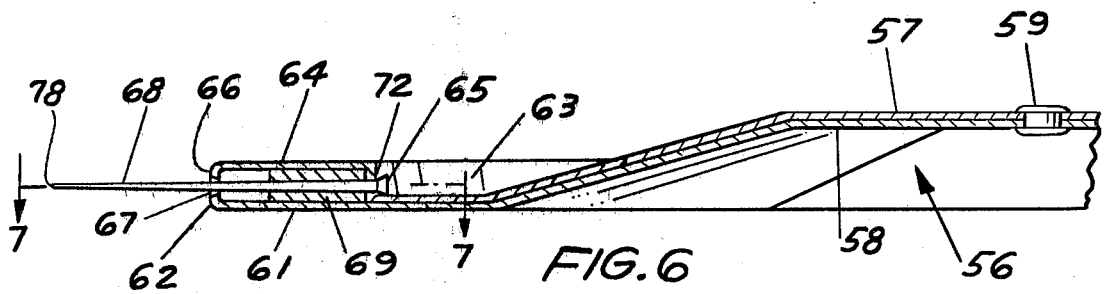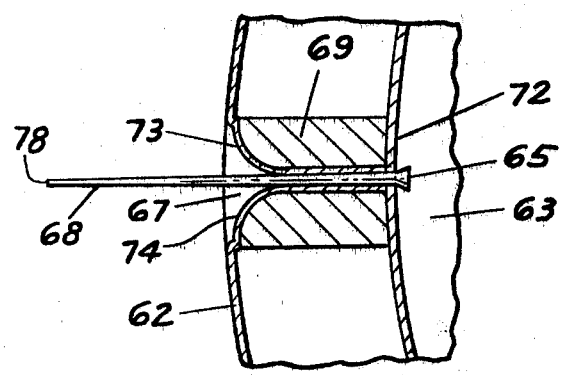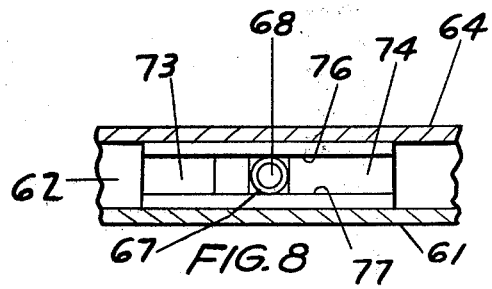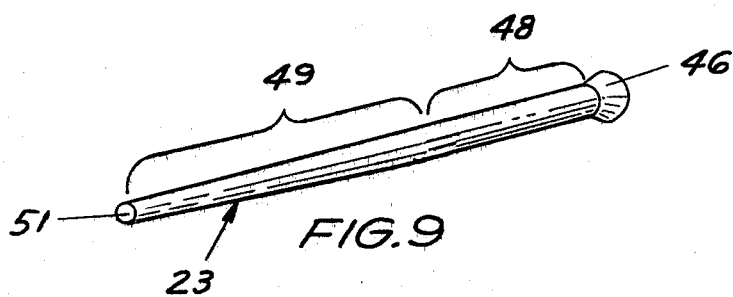

ROTARY-TYPE LAWNMOWER

RELATED APPLICATIONS

This application is a continuation of Application Ser. No. 19,057, filed Mar. 9, 1979, now abandoned, which is a continuation of Application Ser. No. 786,309, filed Apr. 11, 1977, now abandoned, which is a continuation-in-part of Application Ser. No. 674,323, filed Apr. 7, 1976, now U.S. Pat. No. 4,112,653 issued Sept. 12, 1978.

BACKGROUND OF THE INVENTION

1. Field of the Invention

This invention relates to the cutting of vegetation, and more particularly relates to a rotary-type lawnmower employing cutting elements of flexible, non-metallic polymeric material.

2. Description of the Prior Art

In the cutting of vegetation such as lawns and other green spaces, the motorized rotary lawnmower employing a metal blade has been found to be very useful and highly acceptable to both commercial and homeowner users. In this lawnmower, a metal blade of between 18 and 36 inches is rotated about a vertical axis, with a peripheral tip speed of several thousand feet per minute. The blade, weighing from about three to seven pounds, represents a tremendous amount of force as kinetic energy. This vast force is advantageous in providing a relatively uniform rotational speed for cutting vegetation. However, the disadvantages of a moving heavy metal blade are most apparent. The blade has inflicted injuries to persons in the range of nearly a hundred thousand reported accidents per year. For example, the metal blade at operative rotary speeds, upon contact with a human part such as a finger or foot, results usually in a severe injury.

Various governmental agencies and industrial organizations have suggested using guards, dead-man controls, and other safety features on the rotary lawnmower in an attempt to reduce the magnitude, severity and number of injuries inflicted by the rotary metal blade. Unfortunately, the ultimate problem with the rotary-bladed lawnmower is in the rotary blade, which provides not only the desired cutting action for vegetation removal, but also the hazardous instrumentality for injury to humans.

Examination of the cutting action involved with the rotary metal blade shows that only its tip actually cuts the vegetation. However, the remainder of the blade moves at high angular velocities and can inflict as much injury to objects and to humans as the cutting tip. A small metal blade could be mounted peripherally upon a disc so that a safer rotary lawnmower would be obtained while preserving the desired cutting action of the cutting tip. Usually, the small metal blade must be pivotally mounted to the rotating disc. As a result of wear, accidents or misuse, the blade can escape from the disc at operative speeds, becoming a most destructive projectile.

The hazards with metal blades in rotary-type edgers and trimmers have been avoided by apparatus defined in U.S. Pat. Nos. 3,708,967; 3,826,068; and 3,859,776. In these patents, there are described apparatus employing a rotating head carrying one or more extending flexible non-metallic cutting members which are adapted for cutting and trimming vegetation and the like. The cutting members are preferably Nylon ® lines within certain relationships of diameter, length and tip peripheral speed. Apparatus constructed according to these patents have found immediate commercial success and are rapidly supplanting the use of metal-bladed trimmers and edgers, because of (1) the great safety in operation provided by this equipment; and (2) the better vegetation-cutting performances in edging and trimming of this equipment.

A lawnmower constructed in accordance with the operating criteria of these patents has been referred to as a related application to the present invention now U.S. Pat. No. 4,112,653. In this related case, the lawnmower employs one or more flexible non-metallic cutting members such as cord-like Nylon ® line. The line is mounted upon a planar-type disc member which is rotated by an internal combustion or electric motor. The cutting members are of short length and have peripheral tip speeds of between about 14,000 and about 30,000 feet per minute. Lawnmowers constructed according to this principle have been demonstrated as cutting vegetation as well as does the rotary metal-bladed lawnmower.

The present invention is a rotary lawnmower which improves upon the structure of the lawnmower in the related case. In particular, the present lawnmower is constructed so as to be completely safe to the user. In no event can the user encounter the rotating elements of this novel lawnmower and be injured as if struck by a rotating metal blade. The present lawnmower employs a cutting pin formed into a novel structure from a flexible and non-metallic polymeric material. This cutting pin is easily inserted and removed from a rotatable head member and performs cutting operations substantially equal to metal-bladed rotary lawnmowers but without their attendant serious hazards.

SUMMARY OF THE INVENTION

In accordance with this invention, a rotary-type lawnmower is provided which has a wheeled chassis adapted to travel over vegetation-covered ground's surface. The lawnmower carries a prime mover for rotating a downwardly-extending vertical drive shaft. A planar head member mounted upon the drive shaft is rotated about a vertical axis relative to the ground's surface. One or more non-metallic flexible and elongated cutting pins of novel construction are carried on the head member. Each cutting pin has a tapered free-traveling end portion extending radially outward from the head member to a cutting end located at a cutting plane which resides substantially perpendicular to the vertical axis. Each cutting pin also has an enlarged part to provide a releasable mounting within aperture means located adjacent the periphery of the head member. The head member carries supports for supporting each cutting pin against vertical deflection in the free-traveling end portion, resulting from contact with vegetation being cut. As a result, each cutting end remains in the cutting plane for cutting vegetation at a uniform height above the ground's surface.

In other embodiments of the lawnmower, the head member and cutting pin have additional novel features in that the cutting pin is easily mounted and removed from the head member and provide a long, useful life. In addition, the lawnmower is arranged so that at operative speeds, contact of the head member or cutting pin with a portion of the human body will not result in serious injury. Other novel features of the present lawnmower will be appreciated from the following description.

DESCRIPTION OF THE DRAWINGS

FIG. 1 is a perspective view of a rotary-type lawnmower constructed in accordance with this invention;

FIG. 2 is a partial vertical cross-section of the lower portion of the lawnmower shown in FIG. 1, in illustration of the novel cutting pins and disc head member;

FIG. 3 is a planar view taken along line 3—3 of FIG. 2;

FIG. 4 is a partial section taken along line 4—4 of the head member shown in FIG. 3;

FIG. 5 is a partial elevation view taken along line 5—5 of FIG. 3, and illustrates the projection of the cutting pin from the head member;

FIG. 6 is a partial vertical section (similar to FIG. 2), but of a second embodiment of the disc head member of the present invention;

FIG. 7 is a partial cross-section taken along line 7—7 of the head member of FIG. 6;

FIG. 8 is a partial elevation view of the head member of FIG. 6; and

FIG. 9 is a perspective view of the cutting pin employed in the head members shown in the preceding figures.

DESCRIPTION OF SPECIFIC EMBODIMENTS

Referring now to FIG. 1, there is shown one embodiment of a rotary-type lawnmower 11 of the present invention. The lawnmower consists of a chassis 12 having a plurality of wheels 13 for movement over vegetation-covered ground's surface. To facilitate movement, the lawnmower 11 has an upstanding handle 14 which may carry various motor and operating controls. The chassis 12 carries motor 16 which may be gasoline powered. In the fashion of rotary-type lawnmowers, the lawnmower 11 has a circular skirt 17 which extends substantially about the chassis 12 with right-handed grass discharge 18. Preferably, the chassis 12 is provided with a door 19 hingedly-mounted at the forward portion of the lawnmower 11. Raising the door 19 permits inspection and servicing of the novel cutting pins and head member of the present invention. The door 19 can include interlocks (not shown) which immediately stop or prevent the operation of the motor 16. A head member 21 carrying cutting pins 23 and 24 is shown in phantom beneath the chassis 12.

In FIG. 2, the construction of the head member 21 and cutting pins 23 and 24 are shown in greater detail in an enlarged scale. The head member is planar in configuration without substantial axial dimension to facilitate rotation on a vertical shaft for purposes of the present invention. In the embodiment illustrated, the head member 21 may have a vertical dimension less than one inch and preferably has a smooth and continuous lower surface 25 which extends radially outward from the vertical driveshaft 26 of the motor 16. The head member 21 is secured to the driveshaft 26. For this purpose, a keyed adaptor 27 on shaft 26 engages the upper surface of the head member 21. A flange 28 engages the lower surface 25 and is threadedly mounted by a stud 29 at the lower extremity of the shaft 26. The head member 21 should be constructed of a rigid material which does not flex at the operative speeds (e.g. 3,000 r.p.m.) of the lawnmower 11. For example, the head 21 can be constructed as a disc-like sheet steel member 22 (formed of 1/16th-inch thick steel plate) having a circular rim 31 forming a continuous and unbroken periphery. The lower surface 25 of the head member 21 should be smooth and with no significant projections or recesses that could, on contact, injure a human part when the head member 21 is rotated at operative speeds.

The pins 23 and 24 preferably project at a slight downward angle from the head member 21. A downwardly-projecting angle of three degrees relative to the cutting plane has been found to provide good results in the lawnmower. However, the cutting pins may project radially outward parallel to the ground's surface. It is preferred to use downward angles of substantially less than 10 degrees for best cutting results. The downward angle of projection in the cutting pins need only be sufficient to provide clearance beneath the head member 21 relative to the cutting plane. In this manner, clearance is provided between the head member 21 and the cut vegetation traversed by the lawnmower.

The cutting pins 23 and 24 are spaced at 180 degrees apart on the head member 21. However, a single cutting pin might be used. Preferably, a plurality of cutting pins are employed at equal angular dispositions about the periphery of the head member 21. The cutting pins 23 and 24 are carried on the head member 21 in a mount for ready installation and removal. Also, the pins are specially supported to project radially beyond the rim 31.

Referring now to FIGS. 3 and 4, the cutting pins 23 and 24 are slidably inserted into the head member 21 through elongated openings 32 and 33 formed within one of the upper supports or cross-members 34 and 35. The members 34 and 36 are secured by rivets to the disc member 21. Passageways are provided in cross-member 34 to receive the pins 23 and 24, and they also form apertures 41 in the rim 31. The pins are inserted and removed by opening the door 19 upon the top surface of the chassis 12 of the lawnmower 11. Insertion and removal of the pins are facilitated by providing an inclined ramp-like surface 39 at the inward extremity of the openings 32 and 33. The pins are received within the passageways 38 and held against displacement radially outward when the head member 21 is rotated at operative speeds. For this purpose and for other reasons, the pins have a unique construction.

The openings 38 and apertures 41 within the head member support the pins against vertical displacement in the free-traveling end portions extending into the cutting plane beneath the lawnmower 11. For this purpose, the openings 38 and apertures 41 confine the pins against vertical movement. However, the openings and apertures provide a suitable clearance for the pin 23 and permit lateral deflection of a certain limited amount. Lateral deflection of the pins may be provided by elongation of horizontal extremities 42 and 43 of the aperture 41. Preferably, the extremities 42 and 43 provide curvilinear surfaces as shown in FIG. 5 so that the pins can deflect laterally on curved surfaces during cutting operations. Each aperture in cooperation with the adjacent passageway supports the pins against vertical deflection in any significant amount during cutting operations. Near-zero vertical deflection of the cutting pins produces effective cutting of vegetation at a uniform height above the ground's surface. These results are further enhanced by the novel configuration and construction of the cutting pins.

Referring to FIG. 9, one unique construction of the pin 23 is shown in greater detail. The cutting pin 23 has an enlarged part 46, preferably located at its end. The part 46 engages the inward-presented surface 47 of the opening 32. As a result, part 46 limits the radial outward movement of the pin 23 in the head member 21. A preferred construction of the pin 23 uses a frustum as the part 46 which merges with The conical part 48, which serves to lock the pin 23 within the passageway 38 against radial displacement from the head member 21 and prevents any possible rotation of angular movement. The same result, of course, could be obtained by providing the enlarged part 46 on the pin 23 with non-round shapes to cooperate with a non-circular passageway 38. The cutting pin 23 also has supporting surfaces on portion 48 formed adjacent the head 46. These surfaces usually are smooth sidewalls. These surfaces on portion 48 cooperate with the passageway 38 in supporting and mounting the cutting pin 23 in the head member 21. The cutting pin 23 has a portion 49 which extends radially beyond the head member 21 to a cutting end 51.

The portion 49 can be termed the "free-traveling end portion" of the pin 23. The portion 49 is tapered to (1) assist in mounting the pin 23 within the passageway 38, and (2) reinforce the support of pin 23 against vertical deflection resulting from contact of cutting end 51 with the vegetation being cut beneath the lawnmower 11. Preferably, the sidewall surfaces of the portion 49 are straight. The taper of portion 49 does not have to be of a great magnitude, and usually a few degrees of tapering are sufficient. For example, the cutting pin 23 may be circular in cross-section throughout its extent from the cutting end 51 to the head 46. The taper provides a one-half reduction in diameter over the portion 49 for good results.

The taper of the portion 49 is related, also, to the length of the pin 23 supported in the passageway 38 and aperture 41. More particularly, the supported portion 48 of the pin 23 consists of between about 30 and about 70 percent of its length for useful results. Preferably, at least 30 percent of the length of the pin 23 is supported in the head member 21 for good results in the operation of the present lawnmower.

The taper in the portion 49 has several unique structural and operational features. First, the taper facilitates the insertion and removal of the cutting pin 23 from the passageway 71. Second, the reduced taper provides additional support of the cutting pin 23 adjacent the circular rim 31, to minimize vertical deflection at the cutting end 51 upon contact with the vegetation being cut. Third, the taper provides a self-dampening characteristic to the portion 49. As a unique result, transverse and longitudinal vibrations in only small magnitudes act upon the supporting portion 48, causing only minimal heating and abrasion of the cutting pin 23 in contact with the head member 21. Fourth, the self-dampening function of the taper in portion 49 reduces the vertical deflection of cutting end 51 by induced vibration from its contact with vegetation being cut. It is estimated that the taper (e.g. one-half diameter reduction) in portion 48 provides a reduction in vibrational forces (both transverse and longitudinal) of nearly 70 percent in magnitude, in comparison to a uniform diameter cutting line equal in cross-section to the cutting end 51 and of equal length to the cutting pin 23.

The cutting end 51 contacts vegetation with considerable force and both longitudinal and transverse vibrational displacements are induced in the cutting pin 23, especially where it is a uniform cross-sectional cutting member. The novel taper in portion 49 reduces the intensity of these complex waves traveling along the cutting pin. The taper of portion 49 provides a non-linear beam in transmitting forces. As a result, complex waves are effectively dampened so that standing wave forces are not produced to injury the cutting pin 23, especially at the cutting end 51. The complex waves become spherical waves in the tapered portion 49 and wave energy is reduced per unit length by the ratio of the cross-sectional area (squared). The elastic support of the cutting pin 23 in the head 21 and surrounding air resistance also dampens the waves' energy.

Thus, the taper in portion 49 not only dampens the wave energy induced into the cutting pin 23, but also assists substantially in reducing the vertical deflection of the cutting end 51 upon contact with the vegetation being cut by acting as a non-linear beam.

Returning to FIG. 4, the part 46 is wedging or forcing into the opening 38 at the surface 47 of the opening 32. This insures positive positioning of the pin 23 in the head 21. However, when desired, the pin 23 is readily removed by merely pushing back on its exposed extremity and removing it from the opening 32. Then, a new or replacement pin may be inserted through the opening 32 into the head member 21. It will be noted that the upper surface of the head member 21 has the only projections and recessed surfaces, but these portions cannot be contacted during operation by the human operator. However, the lower surface 25 of the head member 21 is smooth and continuous without any projections or recesses to injure the human operator while the head is being revolved at operable speeds. For example, the rivet 36 has a flush mounting in the sheet metal disc 22 of end 53 within a countersunk hole.

The cutting pins 23 and 24 are formed of a non-metallic, flexible polymeric material sufficiently rigid to cut vegetation but which can be deflected upon contact with a portion of the human anatomy or rigid material such as glass bottles, baseball gloves, and like objects unexpectedly encountered in everyday use of the rotary lawnmower. In such instances, the cutting pins 23 and 24 will be displaced laterally rearward relative to the direction of rotation of the head member 21, so as to avoid mangling or otherwise injuring an encountered rigid object.

FIGS. 6, 7 and 8 illustrate a second embodiment of a head member 56 employing one or more cutting pins 68, which can be the same as the cutting pin 23. The head member 56 is formed of upper and lower sheet metal discs 57 and 58 which are secured by flush-mounted rivets 59. The head member 56 mounts upon the vertical driveshaft 26 of the lawnmower 11 in the same manner as has been described relative to the head member 21. The lower disc 56 extends radially outward into a flat portion 61 which terminates in an upwardly-curved rim 62. The upper disc 57 extends downwardly to provide a recessed area 63; then it extends upwardly to a flat portion 64, and curves radially outward into a downwardly-extending rim 66. The rims 62 and 63 define an aperture 67 through which the cutting pin 67 projects radially outward into the cutting plane. For present description, the cutting pin 67 is constructed identically in accordance with the cutting pin 23 previously described. The flat portions 61 and 64 contain an insert 69, such as made of brass. A passageway 71 through the insert 69 receives the cutting pin 68. An inward presented surface 72 at the recess 63 is engaged by the enlarged part 65 on the pin 68 and secures the pin against radial outward displacement during rotation of the head member 56.

Referring to FIG. 7, the insert 69 has curvilinear surfaces 73 and 74 which permit a lateral deflection across curved metal surfaces of the pin 68, upon encountering a solid rigid object other than vegetation. In some instances, a slight lateral movement of the pin 68 may be found in cutting heavier than usual vegetation such as dry grass or grass which has not been cut for a substantial period of time. As shown in FIG. 8, the insert 69 has upper and lower horizontal surfaces 76 and 77 to limit the vertical deflection of the cutting pin 68. The surfaces 76 and 77 in conjunction with the unique construction of the cutting pin permit a lateral movement of the pin 68. However, these surfaces substantially restrict the pin 68 from any significant vertical movement or displacement by the cutting end 78 contacting the vegetation being cut beneath the lawnmower 11. Thus, in construction and function the head 56 is similar to the head 21, except that the cutting pin 68 projects radially outward in a substantially parallel relationship to the cutting plane of the vegetation being cut beneath the lawnmower 11. In addition, the discs 56 and 58 have a smooth and continuous lower surface with a central portion which is elevated a small distance above the horizon of the flat portion 61. This dish-construction provides clearance for substantially all of the head member 56 from contacting the vegetation cut by the pin 68 in the cutting plane. If desired, the radial flat portions 61 and 64 of the head member 21 might be inverted so that the cutting pin 68 is mounted and removed from beneath the lawnmower 11, which may be raised for this purpose.

In the lawnmower 11, the cutting pins generally project radially only a few inches beyond the head member. The angular velocity and diameter of the head member and pin are selected for optimum vegetation cutting. The cutting end 51 of the cutting pins should travel at angular velocities of about 14,000 feet per minute, but usually not in excess of about 30,000 feet per minute. In addition, the cutting pins are constructed so as to have a length of at least 20 times the maximum traversed dimension of the cutting ends in contact with the vegetation being cut. Where the cutting ends are circular in cross-section, good results have been obtained with diameters between about 0.060 and about 0.125 inches. Usually the freely-traveling end portion has straight sidewall surfaces forming the taper. However, arcuate or other configurations of these surfaces can be employed for the tapered portion of the cutting pins.

The structure of the cutting pins employed in the lawnmower of the present invention have been substantially described relative to structure. However, the material from which these cutting pins are constructed is equally important. Good results have been employed with cutting pins formed, molded or extruded from a polymeric material such as Nylon ® 6 and Nylon ® 11 polyamide molding compounds. Mixtures of Nylon materials, including fiberglass, fillers and various polyurethane polymeric materials can be employed for this purpose. Reference may be taken to *Modern Plastics Encyclopedia* by McGraw-Hill Publishing Company, October, 1975 at pages 475 through 477, for a description of several Nylon polymeric materials which can be employed to good results in the present invention. Although there are many properties of the polymeric materials which provide good results in construction of the cutting pins, it is preferred that the cutting pins be extruded from the polymeric material so that indigent polymeric chains are aligned longitudinally along the length of the cutting pins. This polymeric material is found to be especially desirable since the cutting ends do not soften and deflect greater at elevated temperatures than at more ambient temperatures. Should the cutting pins soften and deflect readily, the cutting ends of the pins will not remain in a uniform height in the cutting plane above the ground's surface. This produces a cut upon the surface of the grass resembling waves in an ocean.

Examples of polymeric materials include polyamides having Nylon member characteristics of toughness, impact strength, abrasion resistance, elongation, tensile strength and resistance to vibration fatigue and stress cracking. Other materials are selected plastics such as polypropylene, polyvinyl chlorides, monomers, polycarbonates, polystyrene and ABS copolymers.

Although the cutting pins of the present invention have a special utility in conjunction with the head members previously described, these cutting pins could, of course, be used in other apparatus, such as in trimmer-edgers, with good results. For this reason, the cutting pins form a novel article of manufacture with uses other than in the novel lawnmower 11.

From the foregoing, it will be apparent that there has been described a lawnmower employing unique and safe rotary cutting elements which cut vegetation like metal-bladed mowers. No injury can be produced by the flexible cutting pins or the smooth unbroken bottom surface of the rotating head members. In addition, the novel cutting pins can be readily mounted and removed from the head member in the present invention.

Various modifications and alterations in the described lawnmower and cutting pins will be apparent to those skilled in the art, from the foregoing description. These alterations and changes do not depart from the spirit of this invention. For this reason it is intended that these changes be included within the scope of the appended claims. The appended claims define the present invention, and the foregoing description is employed for setting forth the present embodiments as illustrative, and not in limitation thereof.

What is claimed is:

1. In a rotary-type lawnmower having a wheeled chassis adapted to travel over vegetation-covered ground's surface and carrying a prime mower for rotating a downwardly-extending vertical driveshaft, the improvement comprising:
    (a) a planar head member mounted on said driveshaft for rotation about a vertical axis relative to the ground's surface;
    (b) at least one non-metallic, flexible and elongated cutting pin carried on said head member and each said cutting pin having a tapered free-traveling end portion extending radially outwardly from said head member to a cutting end at a cutting plane which resides substantially perpendicular to the vertical axis;
    (c) mounting means for releasably securing each cutting pin by an enlarged part within aperture means located adjacent the periphery of said head member; and
    (d) support means on said head member for supporting each cutting pin against vertical deflection of said free-traveling end portion resulting from contact with vegetation being cut, whereby said cutting end on said free-traveling end portion of each said cutting pin remains in the cutting plane for cutting vegetation at a uniform height above the ground's surface.

2. The lawnmower of claim 1 wherein each said cutting end has a circular cross-section in contact with vegetation being cut.

3. The lawnmower of claim 2 wherein said circular cross-section of said cutting end has a diameter of between about 0.060 and about 0.125 inches.

4. The lawnmower of claim 2 wherein said circular cross-section of said cutting end has a diameter of about 0.100 inches.

5. The lawnmower of claim 1 wherein each said cutting pin is releasably secured within said aperture means with said free-traveling end portion extending at a downward angle towards the cutting plane.

6. The lawnmower of claim 5 wherein the downward angle of said free-traveling end portion is not in excess of 10 degrees relative to the cutting plane.

7. The lawnmower of claim 1 wherein said planar head is a rigid disc having an unbroken peripheral circular rim carrying said aperature means and a smooth and continuous lower surface presented toward the ground's surface.

8. The lawnmower of claim 7 wherein said smooth and continuous lower surface extends from said circular rim across said planar head and has an elevated central portion to provide additional clearance above the ground's surface relative to said circular rim.

9. The lawnmower of claim 1 wherein said cutting pin has a length at least 20 times the maximum transverse dimension of said cutting end in contact with vegetation being cut.

10. The lawnmower of claim 9 wherein said cutting pin has straight sidewall surfaces in said tapered free-traveling end portion.

11. The lawnmower of claim 1 wherein said head member has a continuous circular peripheral rim, a smooth and continuous lower surface, and said rim and lower surface being substantially free of significant projections or recesses capable of impact injury to human parts when said head member is rotated at operative speeds.

12. The lawnmower of claim 10 wherein said supporting means supports between about 30 and about 70 percent of the length of each said cutting pin.

13. The lawnmower of claim 10 wherein said cutting pins have a length at least 20 times the maximum transverse dimension of said cutting ends on said free-traveling end portions in contact with vegetation being cut, and said transverse dimension resides between about 0.060 and about 0.125 inches.

14. In a rotary-type lawnmower having a wheeled chassis adapted to travel over vegetation-covered ground's surface and carrying a prime mover for rotating a downwardly-extending driveshaft, the improvement comprising:
(a) a disc-like head member mounted on said driveshaft for rotation about a vertical axis relative to the ground's surface;
(b) said head member having a peripheral circular rim and carrying aperture means at equal angular spacings about said head member;
(c) non-metallic flexible elongated cutting pins carried on said head member and passing through said aperture means, said cutting pins having tapered free-traveling end portions extending radially outwardly from said circular rim on said head member to cutting ends at a cutting plane which resides substantially perpendicular to the vertical axis;
(d) mounting means on said head member for releasably securing said cutting pins by an enlarged part against unintended radial and angular displacement from said aperture means;
(e) support means on said head member adjacent said circular rim for supporting said cutting pins against vertical deflection of said free-traveling end portions resulting from contact with vegetation being cut, whereby said cutting ends on said free-traveling end portions remain in the cutting plane for cutting vegetation at a uniform height above the ground's surface.

15. The lawnmower of claim 14 wherein said cutting ends in contact with vegetation being cut are circular in cross-section and said cutting pins have straight sidewall surfaces on said free-traveling end portions.

16. The lawnmower of claim 15 wherein said cutting pins have a frustoconical head providing said enlarged part adjacent said aperture means on said head member and said supporting means support between about 30 and about 70 percent of the length of each said cutting pin.

17. The lawnmower of claim 14 wherein said cutting pins are releasably secured within said aperture means with said free-traveling end portions extending at downward angles relative to the cutting plane and said angles being not in excess of about 10 degrees.

18. The lawnmower of claim 14 wherein said head member has a smooth and continuous lower surface, and said rim and lower surface are substantially free of significant projections or recesses capable of impact injury to human parts when said head member is rotated at operative speeds.

19. In a rotary-type lawnmower having a wheeled chassis adapted to travel over vegetation-covered ground's surface and carrying a prime mover for rotating a downwardly-extending driveshaft, the improvement comprising:
(a) a disc-like head member of rigid material mounted on said driveshaft for rotation about a vertical axis relative to the ground's surface;
(b) said head member having a continuous peripheral circular rim and carrying aperture means at equal angular spacings about said head member, said head member having a smooth and continuous lower surface, and said rim and lower surface being substantially free of significant projections or recesses capable of impact injury to human parts when said head member is rotated at operative speeds;
(c) non-metallic flexible elongated cutting pins carried on said head member and passing through said aperture means, said cutting pins having tapered free-traveling end portions extending radially outwardly from said circular rim on said head member to cutting ends at a cutting plane which resides substantially perpendicular to the vertical axis, said cutting pins having a length at least 20 times their maximum width at said cutting end in contact with vegetation being cut;
(d) mounting means on said head member for releasably securing said cutting pins at an enlarged part against unintended radial displacement from said aperture means and said cutting pins projecting in said free-traveling portions either in a plane parallel to said cutting plane or downwardly at an angle not in excess of about 10 degrees relative to said cutting plane;

(e) support means on said head member adjacent said circular rim for supporting said cutting pins between about 30 and about 70 percent of their length substantially against vertical deflection of said free-traveling end portions resulting from contact with vegetation being cut, whereby said cutting ends on said free-traveling end portions remain in the cutting plane for cutting vegetation at a uniform height above the ground's surface.

20. The lawnmower of claim 19 wherein said maximum transverse dimension of said cutting ends in contact with vegetation being cut resides between about 0.060 and about 0.125 inches.

21. The lawnmower of claim 19 wherein said cutting ends have circular cross-sections and straight sidewall surfaces in the reduced taper of said free-traveling end portions, and a frustoconical head providing said enlarged part located adjacent said aperture means.

22. A cutting pin for use in a rotary-type vegetation cutting device, comprising:
(a) an elongated cutting pin formed monolithically of a flexible and non-metallic polymeric material;
(b) said cutting pin having a first portion providing supporting surfaces and thereon an enlarged part as a securing means, and said first portion comprising between about 30 and about 70 percent of the length of said cutting pin;
(c) said cutting pin having a cutting end with an intervening free-traveling end portion between said cutting end and said first portion, and said free-traveling end portion having a taper from said first portion to said cutting end; and
(d) said cutting end having a transverse dimension between about 0.060 and about 0.125 inches with the length of said cutting pin being at least 20 times said transverse dimension wherein said free-traveling end portion remains sufficiently rigid to cut vegetation at a uniform height when traveling in a rotational path at a tip speed of said cutting end of approximately 14,000 to 30,000 feet per minute and may be subject to unsupported deflection sufficient to pass by an object struck by said cutting end without breaking said cutting pin.

23. The cutting pin of claim 22 wherein said cutting end has a circular cross-section and straight sidewall surfaces in the taper of said free-traveling end portion, and a frustum head located at the end of said first portion for said enlarged part.

24. The cutting pin of claim 22 wherein said cutting pin is extruded of the polymeric material with the polymer chains therein aligned with the length of said cutting pin.

25. The cutting pin of claim 24 wherein said cutting pin is extruded from a polymeric material selected from the group consisting of Nylon ® 6 and Nylon ® 11 polyamide molding compounds and mixtures thereof.

26. The cutting pin of claim 22 wherein said cutting pins are formed of a polymeric material selected from the group consisting of Nylon ® 6 and Nylon ® 11 polyamide molding compounds and mixtures thereof, with the polymer chains therein aligned with the length of said cutting pin.

27. The cutting pin of claim 22 wherein the polymeric material is selected to have substantially the same deflection temperature for fiber stress conditions of 66 p.s.i. and 264 p.s.i.

28. The cutting pin of claim 27 wherein the polymeric material is selected from either Nylon ® 6 or Nylon ® 11 polyamide molding compounds.

29. A cutting pin for use in a rotary-type vegetation cutting device, comprising:
(a) an elongated cutting pin having a first portion extending lengthwise along said cutting pin and forming supporting surface means for supporting said cutting pin in a passageway formed in a rotary head member of said device;
(b) said cutting pin having a cutting end with an intervening free traveling end portion between said cutting end and said first portion, said free traveling end portion being tapered radially outward from said first portion to said cutting end and being adapted to extend unsupported radially beyond the periphery of said head member; and
(c) said cutting pin being formed as a monolithic polymeric member and with transverse and lengthwise dimensions of said free traveling end portion which will provide sufficient rigidity when rotating with said head member to cut vegetation at a substantially uniform height and which will permit deflection of said free traveling end portion sufficiently upon striking a rigid object in the path of said cutting pin offering greater resistance to movement than said vegetation to permit said cutting end to pass by said object.

30. In a rotary-type lawnmower having a chassis adapted to travel over vegetation-covered ground and carrying a prime mover for rotating a downwardly-extending vertical driveshaft, the improvement comprising:
(a) a head member mounted on said drive shaft for rotation about a vertical axis relative to the ground's surface; and
(b) a plurality of non-metallic, elongated cutting pins carried on said head member circumferentially spaced apart one from the other and extending generally radially outward from said axis, each said cutting pin having a first portion extending lengthwise of said cutting pin and supported by cooperating support means on said head member, each said cutting pin having a second portion extending lengthwise of said cutting pin from said first portion and radially outward beyond the periphery of said head member to an unsupported distal end of said cutting pin, and each said cutting pin being formed of an elastic material and with transverse and lengthwise dimensions of said second portion which will provide sufficient rigidity of said second portion to cut vegetation at a substantially uniform height when rotating said head member at a tip speed of said end of approximately 14,000 to 30,000 feet per minute, and which will permit deflection of said second portion sufficient upon striking a rigid object in the path of said cutting pin offering greater resistance to movement than said vegetation to pemit said end to pass by said object.

31. The lawnmower set forth in claim 30 wherein:
said support means on said head member includes means forming a radially extending passageway for receiving said first portion of said cutting pin.

32. The lawnmower set forth in claim 31 wherein:
said head member includes means disposed radially outward from said means forming said passageway and engageable with said second portion of each said cutting pin to minimize vertical deflection of said second portion resulting from contact with vegetation being cut.

33. The lawnmower set forth in claim 31 wherein:
said means for receiving said first portion extends from 30% to 70% of the length of said cutting pin when said cutting pin is disposed in said passageway.

34. The lawnmower set forth in claim 31 wherein:
said second portion includes a tapered portion extending toward said end and extending between 30% and 70% of the length of said cutting pin.

35. The lawnmower set forth in claim 34 wherein:
the maximum transverse dimension of said tapered portion of said second portion is approximately twice the minimum transverse dimension of said tapered portion.

36. The lawnmower set forth in claim 30 wherein:
each said cutting pin is made of a monolithic polymeric material.

37. In a rotary-type lawnmower having a chassis adapted to travel over vegetation-covered ground and carrying a prime mover for rotating a downwardly-extending vertical driveshaft, the improvement comprising:
(a) a head member mounted on said drive shaft for rotation about a vertical axis relative to the ground's surface;
(b) a plurality of non-metallic, elongated cutting pins carried on said head member circumferentially spaced apart one from the other and extending generally radially outward from said axis, each said cutting pin having a first portion extending lengthwise along said cutting pin and supported in cooperating support means on said head member including a circumferentially spaced apart radially extending passageway for receiving said first portion, each said cutting pin having a second portion extending lengthwise of said cutting pin from said first portion and tapered radially outward from said support means on said head member to a distal end of said cutting pin, at least part of said second portion including said end extending radially beyond the periphery of said head member; and
(c) each said cutting pin being formed as a monolithic polymeric member and with transverse and lengthwise dimensions of said second portion which will provide sufficient rigidity when rotating with said head member to cut vegetation at a substantially uniform height and which will permit deflection of said second portion sufficiently upon striking a rigid object in the path of said cutting pin offering greater resistance to movement than said vegetation to permit said end to pass by said object.

38. The lawnmower set forth in claim 37 wherein:
each said cutting pin is releasably secured within said passage with said second portion extending at a downward angle relative to a cutting perpendicular to said axis, said angle being not in excess of about 10 degrees.

39. The lawnmower set forth in claim 37 wherein:
said head member comprises a circular disc having a smooth and continuous lower surface, and the periphery and said lower surface of said head member are substantially free of significant projections other than said cutting pins or recesses capable of impact injury to human parts when said head member is rotated at operative speeds.

* * * * *